United States Patent [19]
Glew et al.

[11] Patent Number: 5,561,780
[45] Date of Patent: Oct. 1, 1996

[54] METHOD AND APPARATUS FOR COMBINING UNCACHEABLE WRITE DATA INTO CACHE-LINE-SIZED WRITE BUFFERS

[75] Inventors: Andy Glew, Hillsboro; Nitin Sarangdhar; Mandar Joshi, both of Beaverton, all of Oreg.

[73] Assignee: Intel Corporation, Santa Clara, Calif.

[21] Appl. No.: 176,395

[22] Filed: Dec. 30, 1993

[51] Int. Cl.$^6$ ................................................. G06F 12/08
[52] U.S. Cl. ...................... 395/453; 395/417; 395/403; 395/872
[58] Field of Search ...................... 395/453, 403, 395/460, 417, 872

[56] References Cited

U.S. PATENT DOCUMENTS

| | | | |
|---|---|---|---|
| 5,317,711 | 5/1994 | Bourekas et al. | 395/184.01 |
| 5,325,499 | 6/1994 | Kummer et al. | 395/470 |
| 5,394,515 | 2/1995 | Lentz et al. | 395/115 |

OTHER PUBLICATIONS

Popescu, et al., "The Metaflow Architecture," IEEE Micro, pp. 10–13 and 63–73, Jun. 1991.

*Primary Examiner*—Matthew M. Kim
*Attorney, Agent, or Firm*—Blakely, Sokoloff, Taylor & Zafman

[57] ABSTRACT

The write-combining buffer combines data from separate data write operations into cache-line-sized buffer units for uncacheable types of data, such as frame buffer data. The write-combining buffer is implemented within a microprocessor having a data cache unit storing cacheable data within cache-lines. The data cache unit includes components and circuitry provided for efficiently inputting and outputting cache-line-sized units of data. By combining many uncacheable data write operations within a single cache-line-sized buffer, the circuitry and techniques employed for processing cache-lines are exploited in the processing of uncacheable data as well. A particular implementation is described wherein uncacheable data units corresponding to graphics write operations within an out-of-order microprocessor are combined into cache-line-sized buffers, then transmitted to a frame buffer using a burst mode eviction. Processor ordering requirements are ignored and global observability is relaxed for the graphics write operations. If the cache line sized buffer is not full when evicted, then a sequence of one or more burst-mode partial writes are employed to evict all data within the cache line sized buffer. If partial writes are employed, no delay between the partial writes is required.

40 Claims, 5 Drawing Sheets

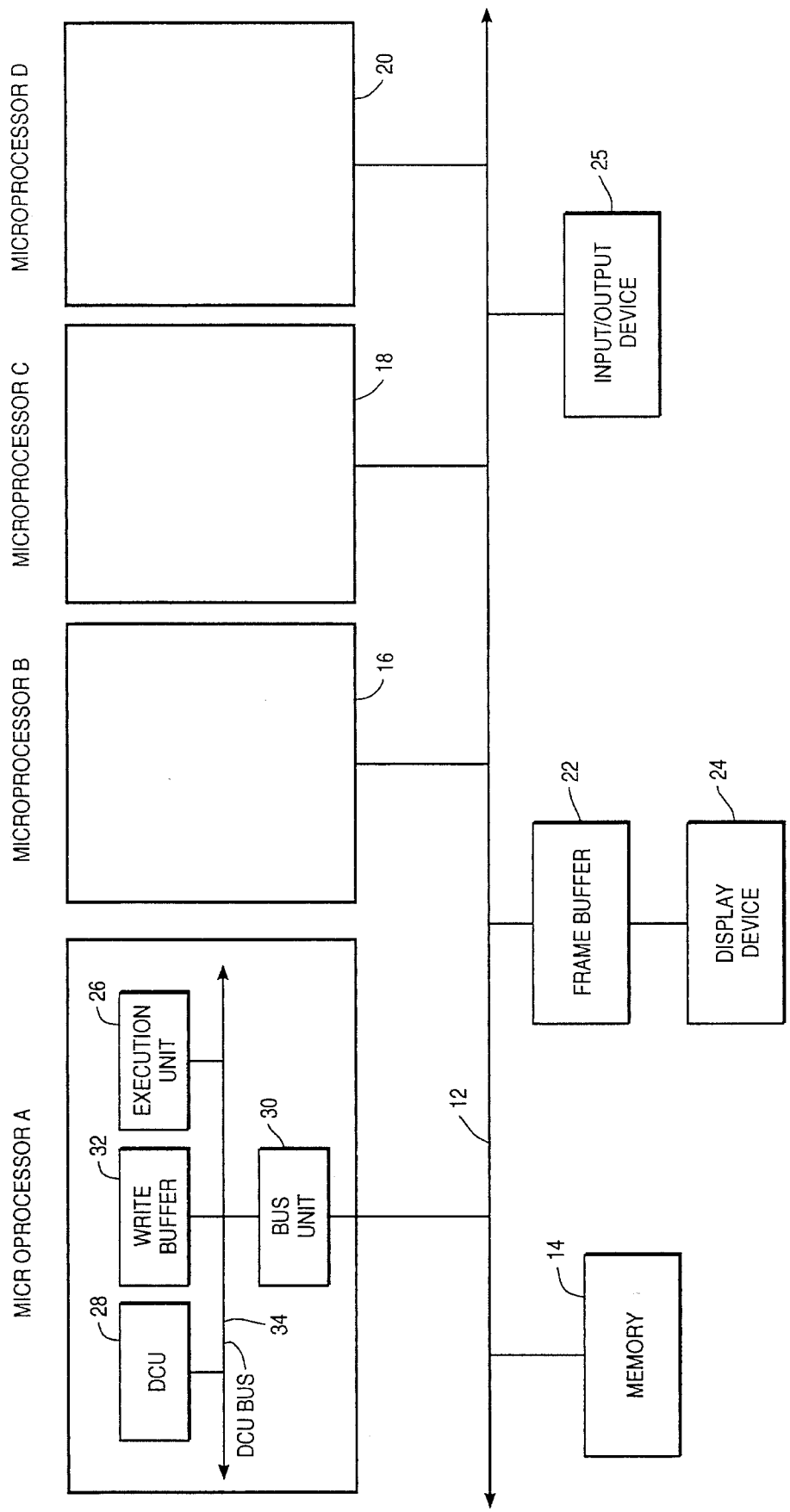
FIG_1

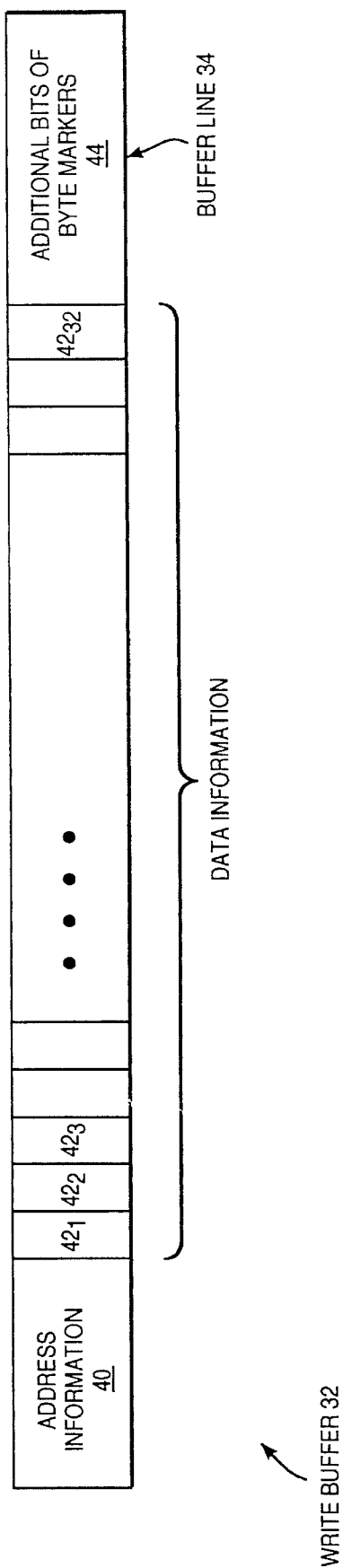

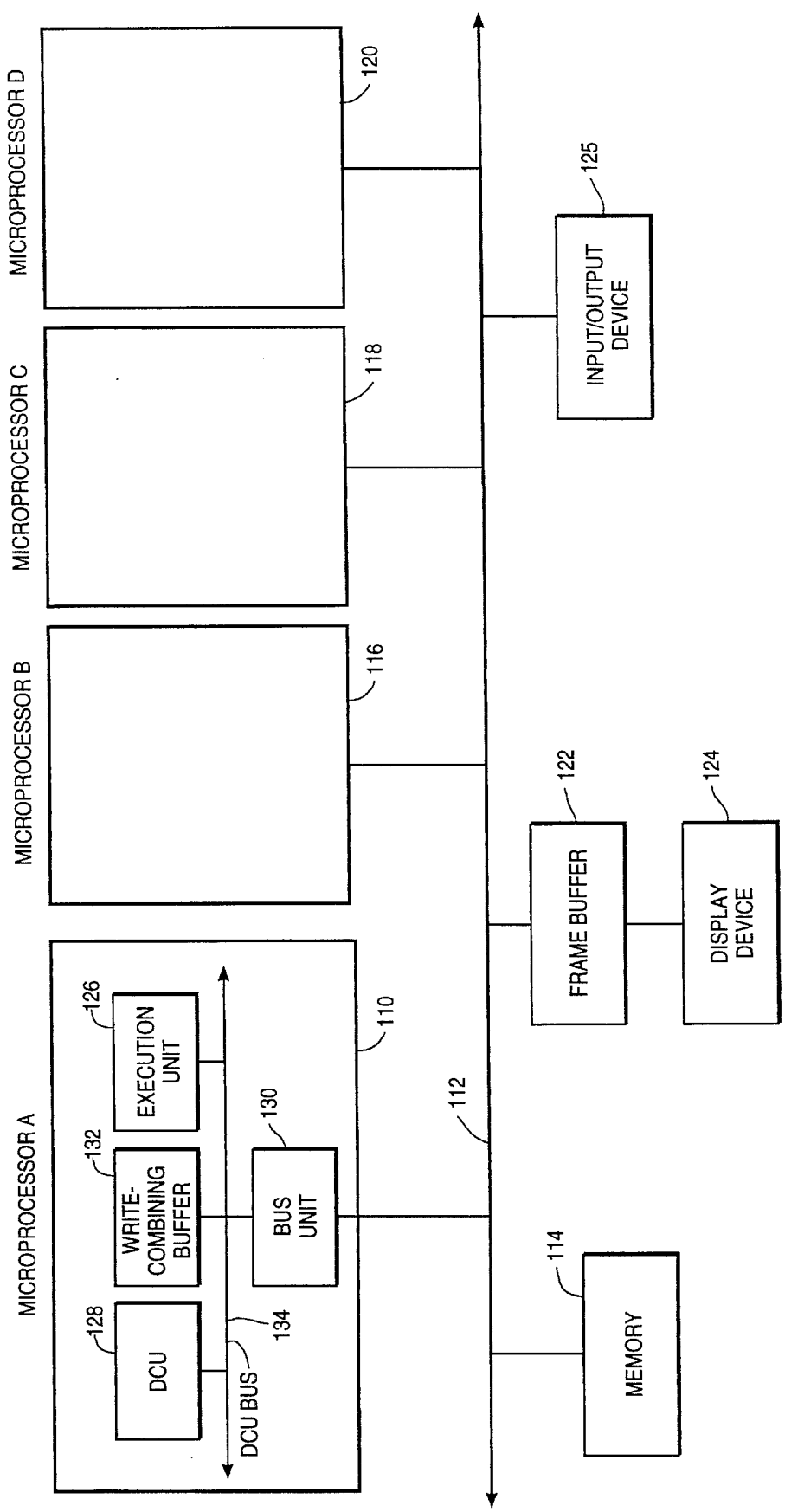
FIG_3

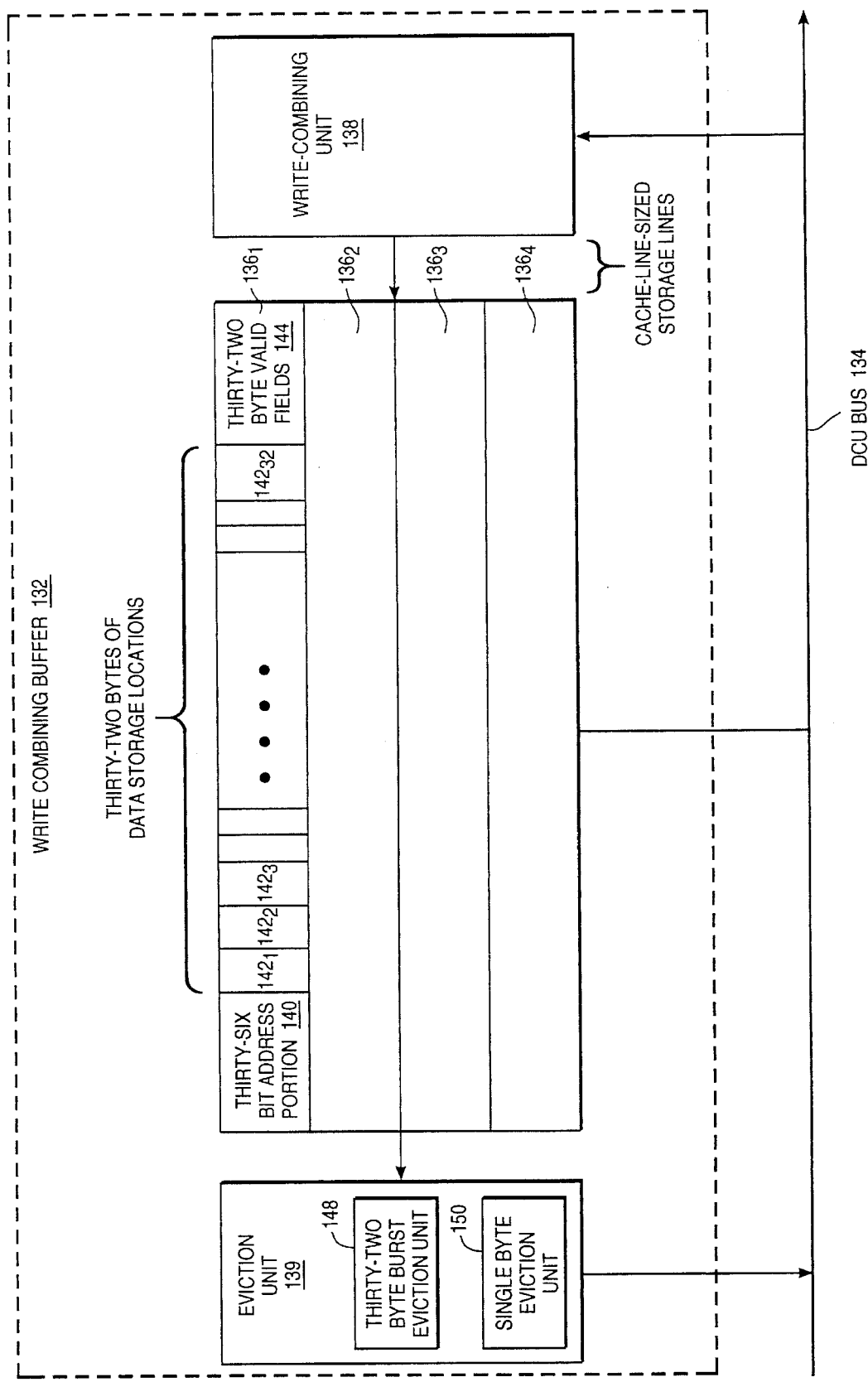
FIG_4

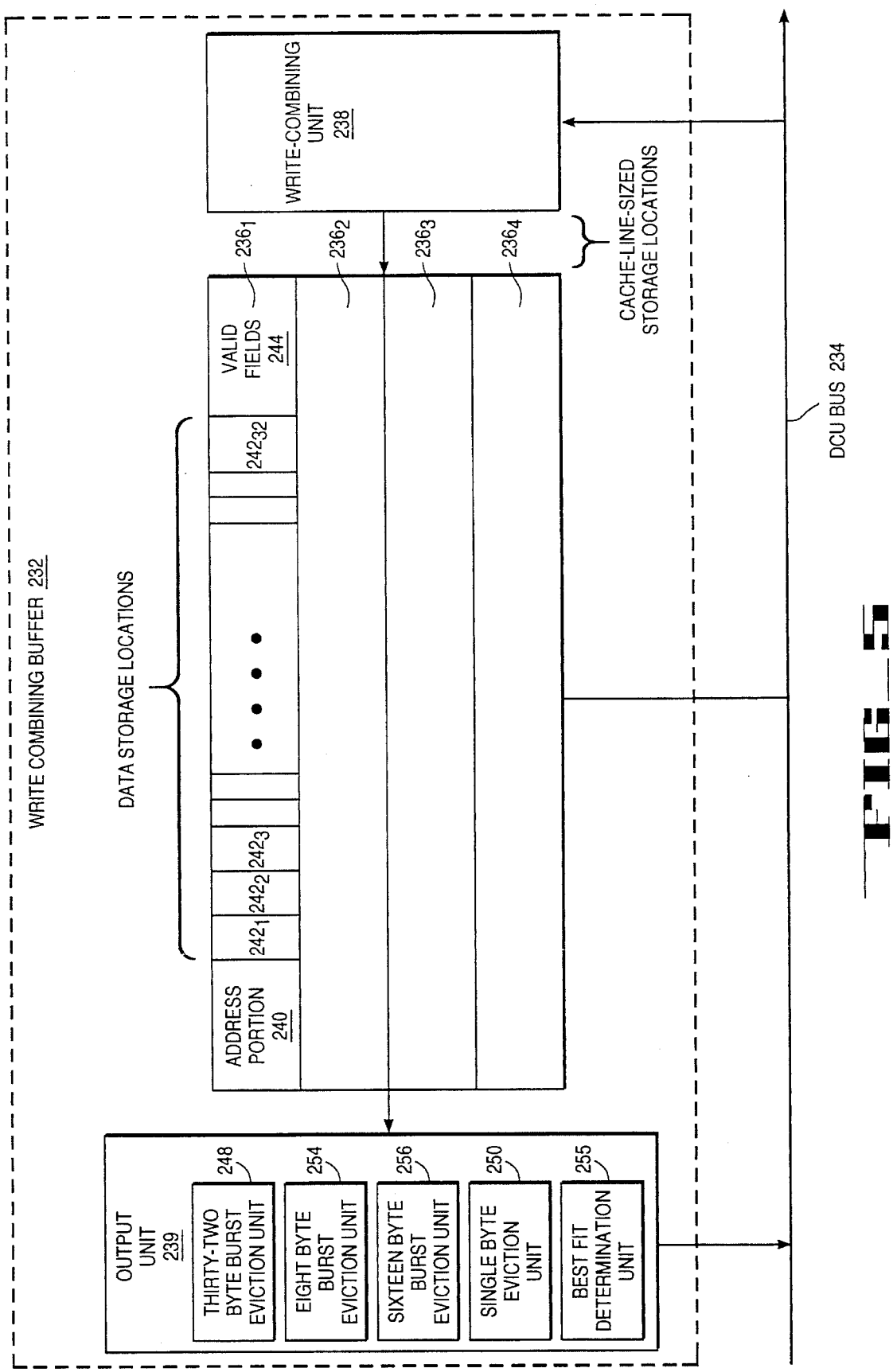
FIG_5

METHOD AND APPARATUS FOR COMBINING UNCACHEABLE WRITE DATA INTO CACHE-LINE-SIZED WRITE BUFFERS

BACKGROUND OF THE INVENTION

1. Field of the Invention

The invention generally relates to computer systems and in particular to computer systems wherein data for transmission on a system bus is stored and manipulated in cache-line-sized units.

2. Related Applications

The present application is related to co-pending U.S. patent application Ser. No. 08/171, 528, filed, entitled "Methods and Apparatus for Determining Memory Type by a Processor", U.S. patent application Ser. No. 08/176,364, filed Dec. 30, 1993, entitled "Method and Apparatus for Using a Translation Lookaside Buffer in Real Mode", both of which are assigned to the Assignee of rights to the present application and which are incorporated be reference wherein.

DESCRIPTION OF RELATED ART

On-chip data cache units (DCU's) are commonly used within state of the art microprocessors. To facilitate the caching of data, such DCU's internally store and manipulate data in cache-line units which may, for example, contain thirty-two bytes of data. Cacheable data, such as data corresponding to conventional memory loads or stores, is stored or manipulated within data cache-line units within the DCU. Microprocessor components for accessing the cacheable data are optimized for accessing an entire line at a time. For example, components may be configured for accessing data from the cache-lines and for transmitting the data on a system bus in burst mode.

FIG. 1 illustrates ask exemplary, but not necessarily conventional, computer system employing a microprocessor storing uncacheable data in cache-line-sized units. To exploit the cache-line based components, microprocessor 10 buffers "uncacheable" data within cache-line-sized units. In other words, even for uncacheable data which is not, and perhaps cannot, be stored within the DCU, such as data corresponding to input and output operations, microprocessor 10 nevertheless stores and manipulates the uncacheable data internally within cache-line-sized units. By storing such data within cache-line-sized units, rather than in smaller units, the cache-line based components of the microprocessor are advantageously employed for processing uncacheable data as well as cacheable data. In other words, the granularity of data stored within the microprocessor is cache-line-based.

More specifically, FIG. 1 illustrates a microprocessor 10 connected through a system bus 12 to a memory system 14. The computer system of FIG. 1 is a multiprocessor system wherein additional microprocessors, possibly identical to microprocessor 10, are identified by reference numerals 16, 18 and 20. Also illustrated in FIG. 1 is a frame buffer 22, a graphics output device, such as a CRT, 24 and an input/output (I/O) device 25. System bus 12 interconnects microprocessors 10, 16, 18 and 20, memory 14, frame buffer 22, and I/O device 25.

FIG. 1 also illustrates selected internal functional components of microprocessor 10 including an execution unit 26, a DCU 28, a bus unit 30 and a write buffer 32. The foregoing functional components of microprocessor 10 are each interconnected by DCU bus. Bus unit 30 is also connected directly to system bus 12. In use, data processed by execution unit 26 is loaded from, or stored to, memory 14 using DCU 28 and bus unit 30.

For typical cacheable data, such as data stored in memory 14, an entire cache line containing the data is stored and processed by DCU 28. More specifically, for a read operation accessing a unit of data, an entire cache line containing that unit of data is accessed from the memory and stored in the cache. This is generally referred to a "read for ownership". For a write operation, the entire cache line containing the data unit to be written to is first read from main memory into DCU 28. Once the entire cache line containing the data to be accessed is stored within the cache, individual writes to data units within the cache line may be modified inside DCU 28 in accordance with conventional techniques. Eventually, the entire cache line containing any modified data is written to memory, typically using a burst mode output wherein a single base address for the cache line is output followed by a sequence of all data traits of the cache line.

In a "write through" mode of operation, a modified cache line is written to external memory while the cache line in the DCU is modified. In a "write back" mode of operation, a modified cache line is not written immediately to memory. Rather, the operation of writing the entire cache line is deferred until such becomes necessary. Further details of cache transactions will not be described herein other than to note that bus unit 30 is configured to manipulate cache-line-sized units of data in burst mode to facilitate transmission of data between memory 14 and DCU 28 along system bus 12.

As can be appreciated, not all system transactions require use of DCU 28. For example, graphics write operations for displaying data on graphics device 24 via frame buffer 22 involve the transmission of data which is generally considered uncacheable. Graphics data is typically in the form of eight-bit pixels which are sequentially generated by execution unit 26 for transmission to frame buffer 22 which controls the actual display of the pixels on display device 24. Since bus unit 30 is generally configured to process cache-line-sized units, the uncacheable graphics data is placed one pixel at a time within a write buffer 32 which stores a single pixel of data in a cache-line-sized unit. Bus unit 30 accesses the single pixel of graphics data from write buffer 32 and transmits the data onto system bus 12. As noted above, the storage of data in cache-line-sized units allows cache-line based components to process uncacheable data. Indeed, to further simplify the microprocessor architecture, write buffer 32 may be physically positioned within DCU 28. In FIG. 1, write buffer 32 is shown separate from DCU to clarify that, from a functional standpoint, data contained within write buffer 32 is not cacheable and is not subject to most of the normal cache operations performed by DCU 28.

Although the storage and manipulation of uncacheable data in cache-line-sized units has the certain advantages described above, certain disadvantages arise as well. One particular disadvantage is that much of the cache-line-sized space within write buffer 32 is wasted, particularly for graphics operations wherein only a signal byte is stored within the write buffer. This problem is illustrated in FIG. 2, which provides a block diagram of the cache-line-sized write buffer 32 storing a single buffer line 34. Write buffer line 34 includes space for address information 40, thirty-two bytes of data information $42_1$–$42_{32}$, and additional bits of byte markers 44.

For graphics write operations, as well as for certain other data operations, only a small portion of write buffer 34 is used. For example, only a single eight-bit pixel unit is stored within line 34 along with address information. Once one eight-bit pixel is stored within line 34, bus unit 30 accesses line 34 to "evict" the single eight-bit pixel onto bus 12 for transmission to frame buffer 22. To display a second pixel, a second eight bits of information is stored within line 34, then evicted by bus unit 30. As can be appreciated, to display an entire image, thousands or millions of such operations may be required to transmit the image to frame buffer 22 for subsequent display on graphics device 24. Any speed advantage that may be gained by storing the data in cache-line-sized units may be forfeited by storing only a single pixel of data within each cache-line at a time. A typical graphics display may contain 1024×1024 pixels with each pixel containing eight-bits, such that transmission of one screen of data may require one million separate pixel transmissions, each requiring an access to write buffer 32 and a corresponding bus transmission along system bus 12. The problem is far greater when displaying continuous motion video having a typical frame rate of twenty-four frames per second. Such may require twenty-four million write operations per second. With a typical write operation on system bus 12 requiring 3 clock cycles, a total of seventy-two million clocks per second are required to transmit the continuous motion video on bus 12 to frame buffer 22. Hence, at minimum, bus 12 must operate at 72 MHz just to transmit the graphics data, with no other data transmission occurring. To provide sufficient bus bandwidth to handle seventy-two million clocks per second of video data while also transmitting a wide variety of other data, an extraordinarily fast and heretofore commercially impractical bus would be required. It would be desirable to provide a method for greatly limiting the bus bandwidth required to transmit graphics data while still gaining the advantages of storing data within cache-line-sized data units.

Further with regard to FIG. 1, it should be noted that the system illustrated therein is a microprocessor system wherein each of the microprocessors 10, 16, 18 and 20 may be competing for access to system bus 12, thus requiring an even greater amount of bus bandwidth. Also, since each microprocessor may be independently accessing memory 14 or frame buffer 22, it is important that "processor ordering" be preserved. Processor ordering implies that write operations generated by one processor must be observed in the same order by all processors. Hence, if microprocessor 10 performs two write operations, W1 and W2 to locations L1 and L2, respectively, within frame buffer 22, then any other processor reading the two locations L1 and L2, must read the value W1 in location L1 before reading the value W2 in location L2. Software execution problems may arise, for example, where one processor writes data to location L1 then writes a verification flag to location L2. If the other processors do not preserve that order and instead read the flag first before reading the data, a software problem may occur. To ensure the processor ordering is preserved, each individual graphics write operation must be "globally observed". To this end, a delay is provided between each individual graphic write to allow previous writes to be observed by other microprocessors or by other processes within a single microprocessor system, such as can occur if multiple bus drivers are present. Also, to help insure the processor ordering is preserved, within a multiprocessor environment, each individual processor typically snoops the caches and cache line transactions of other processors. The aforementioned objective of providing an improved method for limiting bus bandwidth should be achieved in a manner which accounts for processor ordering such that software execution problems are avoided.

In the foregoing descriptions of FIGS. 1 and 2, it was assumed that any graphics write operation generated by the microprocessor can immediately be executed once the address for the memory instruction has been determined. However, with certain microprocessor architectures and for certain applications, a memory instruction must be deferred pending the resolution of one or more conditions. In such systems, once the address is determined, the memory instruction cannot, or should not, be immediately executed. Such may occur, for example, in a microprocessor which is capable of generating out-of-order or speculative memory instruction operations. In an out-of-order microprocessor, memory instruction operations may be issued by the execution unit in an order other than that which is defined by a software program. Out-of-order issuing instructions may be employed to enhance overall processor efficiency by exploiting any parallel processing capabilities of the microprocessor. When instructions are issued out-of-order, it may be necessary to hold one or more of the instructions in abeyance pending execution of other, later issued, instructions. For example, the execution of an instruction may require deferral until the resolution of a branch condition, such as an "If" statement.

In a microprocessor architecture capable of speculative processing, further efficiency is gained by performing a branch prediction upon the occurrence of any unresolved branch condition. Branch prediction allows instructions subsequent to the branch to be speculatively processed pending resolution of the branch condition. In other words, for each branch condition the microprocessor predicts which branch is to be taken, then executes subsequent instructions speculatively. The ability to execute instructions speculatively further exploits any parallel processing capability of a system by allowing at least some instructions which depend upon a branch condition to be performed prior to actual resolution of the branch condition. General aspects of out-of-order and speculative processing are determined in "Super Scalar Microprocessor Design." by Mike Johnson, Prentice-Hall, Inc. 1991.

As can be appreciated, numerous limitations exist as to which instructions can be performed out-of-order and which can be performed speculatively. Once possible limitation to the execution of instructions is that actual memory instructions to main memory may require deferral until the execution of prior instructions or until the resolution of prior branch conditions. For example, it may be undesirable to perform a store to a frame buffer based on a speculative store operation. Such a "speculative" store to a frame buffer location would likely result in a pixel being erroneously displayed, if the store is based on a mis-predicted branch.

The objective of limiting bus bandwidth should be achieved in a manner which accounts for the speculative execution of instructions within an out-of-order microprocessor.

SUMMARY OF THE INVENTION

In accordance with one aspect of the invention described herein, a method and apparatus is provided for enhancing the efficiency of accessing uncacheable data stored within cache-line-sized buffers within a microprocessor, particularly to enhance graphics transmission speed. An improvement is achieved by combining a plurality of uncacheable data units within a single cache-line-sized write buffer line, then transmitting or evicting all data units within the entire cache-line-sized buffer line onto a system bus either using sequential partial writes or in a burst mode. The cache-line-sized write buffer is herein-referred to as a "write-combining buffer."

Hence, write combining is exploited for uncacheable data, particularly for frame buffer data. However, unlike conventional cache processing, no read-for-ownership operations are performed on the uncacheable data maintained within the write-combining buffer. Furthermore, processor ordering requirements are ignored and global observability requirements are relaxed. In particular, when the buffer line is evicted using partial writes, no substantial delay is provided between consecutive partial writes, which are typically needed if global observability must be provided.

In a preferred embodiment, the write buffer includes four buffer lines, each storing thirty-six bits of address data, thirty-two bytes of write data and thirty-two bytes of data byte marker fields. Up to thirty-two individual data units, such as eight-bit pixels, may be combined within a single line of the write buffer, then evicted in a burst mode wherein five clock cycles are used to evict all thirty-two pixels. By combining uncacheable write data within cache-line-sized units and by employing burst mode eviction, thirty-two writes may be achieved within only five clock cycles, in comparison with ninety-six clock cycles required to transmit each pixel individually, with three clock cycles per individual write. Hence, a substantial reduction in graphics bandwidth is achieved. For continuous video displayed on a 1024×1024 graphics display wherein twenty-four mega-write operations are required each second, only 3.75 mega-clocks are required each second for evicting the graphics data. For an exemplary 66 MHz bus, only five percent of the overall bus bandwidth is thereby required to transmit the continuous motion video data.

Also in accordance with the invention, burst mode techniques are exploited for evicting data from the cache-line-sized units of the write buffer even when the write buffer is only partially filled using partial writes. In particular, burst mode means are provided for evicting portions of an unfilled cache line such as eight-byte or sixteen-byte portions. For example, if twenty-four-byes of a thirty-two-byte cache-line-sized buffer need be evicted, a sixteen-byte burst mode eviction means and an eight-byte burst mode eviction means are each activated once to evict the bytes using two partial writes. As noted above, no substantial delay is provided between the partial writes, as may be required if global observability must be maintained. Also, a best fit algorithm is provided for choosing an optimal number of bytes to transmit, given the actual number of bytes contained within the cache-line-sized write buffer line. In this manner, even in circumstances wherein the entire write is not filled with write data prior to eviction, a substantial increase in transmission speed may be achieved over the single byte eviction methods described above.

The microprocessor of the preferred embodiment is capable of issuing speculative memory write operations. Preferably, only data write operations corresponding to cacheable and non-speculative but otherwise speculatable data units are combined in the write-combining buffer. To facilitate a determination of whether data units subject to particular memory write operations are candidates for placing within the write-combining buffer, a value is preferably stored within each memory instruction which identifies, for example, whether the memory instruction is to cacheable or uncacheable data or to speculatable or nonspeculatable data. The memory values are explicitly stored within the microprocessor such that a determination of whether a particular data write is subject to write-combining is determined by the microprocessor without requiring a separate bus transaction, to determine, for example, the cacheability or uncacheability of the data.

The preferred embodiment of the invention employs multiple microprocessors each capable of snooping the DCU's and bus transactions of other microprocessors. However, snooping is not performed on data units maintained within the write-combining buffer or on bus transactions employed for evicting data from the write-combining buffers. Such snooping is not necessary since processor ordering is ignored and global observability is relaxed.

The invention achieves the aforementioned objective of providing an improved method and apparatus for transmitting uncacheable data at high speeds while still allowing for buffering of the data within data cache-line-sized buffers within the microprocessor. Other objects and advantages of the invention will be apparent from the detailed description of the invention provided below.

BRIEF DESCRIPTION OF THE DRAWINGS

FIG. 1 is a block diagram illustrating a computer system having several microprocessors each including a write buffer for storing uncacheable data in cache-line-sized units.

FIG. 2 is a block diagram illustrating the write buffer of FIG. 1.

FIG. 3 is a block diagram illustrating a computer system, configured in accordance with a preferred embodiment of the invention, having several microprocessors each including a multi-line write-combining buffer capable of combining data corresponding to two or more data write operations into a single cache-line-size buffer.

FIG. 4 is a block diagram illustrating an embodiment of the write-combining buffer of FIG. 3 which includes a single burst mode eviction unit.

FIG. 5 is a block diagram illustrating an alternative embodiment of the write-combining buffer of FIG. 4 which includes several different burst mode eviction units.

DETAILED DESCRIPTION OF THE INVENTION

Referring to FIGS. 3–5, preferred and exemplary embodiments of the invention will now be described. Referring first to FIG. 3, a computer system 100 is illustrated, in block diagram form, which includes a microprocessor 110, a system bus 112 and a memory 14. System 100 is a multi-processor system including additional microprocessors 116, 118 and 120. System 100 also includes a frame buffer 122 connected between system bus 112 and a graphics device 124 which may be a CRT display. An I/O device 125 is also connected to system bus 112.

Relevant functional components of microprocessor 110 are illustrated including an execution unit 126, a DCU 128, a bus unit 130, a four-line write-combining buffer 132, each connected by a DCU bus 134. Bus unit 130 is also directly connected to system bus 112. DCU 128 stores data within cache lines. Bus unit 130 is configured to evict entire cache-lines from DCU 128 onto system bus 112 using burst mode techniques.

Write buffer 132 is a four line buffer with each line have the length of a cache-line within DCU 128. Bus unit 130 includes circuitry for accessing the cache-line-sized buffers of write-combining buffer 132 and for transmitting data stored therein onto system bus 112. As will be described in more detail below, write-combining buffer 132 includes means for combining write data corresponding to two or more data writes onto a single one of the buffer lines. By combining multiple data writes into a single cache-line-sized buffer, the cache-line processing capabilities of bus unit 130 are advantageously exploited for transmitting a large number of data writes efficiently onto bus 112. In particular, the burst mode eviction capability of bus unit 130 is exploited to transmit an entire line of write-combining buffer 132 onto system bus 112 burst mode. Hence, by combining multiple data writes onto a single cache-line-sized unit of write-combining buffer 132, rather than by sequentially storing and evicting individual data writes from the write buffer, a substantial improvement in the processing efficiency of data write operations is achieved.

Referring to FIG. 4, the structure and operation of write-combining buffer 132 will now be described in more detail. Write buffer 132 includes four cache-line-sized storage lines $136_1$, $136_2$, $136_3$ and $136_4$. The storage lines are each connected to a write-combining unit 138 and an eviction unit 139 which, in turn, are both connected to DCU bus 134. Each write buffer line 136 includes a thirty-six bit address portion 140, thirty-two bytes of data storage locations, denoted $142_1$, $142_2$ ... $142_{32}$, and thirty-two bytes of byte valid fields 144. Data units corresponding to writes, such as single byte pixels for graphics writes, are received from DCU bus 134 by write-combining unit 138 and stored in one of the individual byte locations 142 of one of the individual data lines 136. For data units larger than one byte, each single unit may require storage in two or more individual byte locations.

Storage into the buffer lines is accomplished in much the same manner that a DCU employs for storing data within cache-lines. For example, for a first data unit to be stored within write-combining buffer 132, the data unit is stored in a first location $142_1$ of buffer $136_1$, with address bits 140 set to identify the base address location of the data. Depending upon the implementation, the address bits may store all or a portion of a physical address or a linear or virtual address of the data unit. A second data unit is then stored in one of the adjacent storage locations, for example $142_2$, if the address of the second data unit shares the base address of the first. If not, the second data unit is placed in the first storage location of buffer line $136_2$. Each subsequent data unit is stored in one of the buffer lines, if possible. If each buffer line includes data with a base address inconsistent with the address of a newly received delta unit, then one of the data lines is evicted to make room for the new data. By eviction, it is meant that all or a portion of the data within the data line is read out from the data line by eviction unit 139 and transmitted along bus 134 to bus unit 130 for subsequent transmission to an external destination device, such as frame buffer 124 (FIG. 3).

For a typical sequence of data writes to a frame buffer, each successive data unit received by write-combining unit 138 has an address sequentially offset from a preceding data unit. Accordingly, as many as thirty-two of the individual data units may be combined within a single buffer line, such as buffer line $136_1$.

Once full, the buffer line is evicted using a thirty-two byte burst eviction unit 148. Conventional data cache-line input and output techniques may be employed for evicting the full buffer line. In particular, burst mode transmission techniques, well understood by those skilled in the art, may be employed for quickly and efficiently transmitting all of the data units from the full line. Indeed, in a preferred implementation, write-combining buffer 132 is physically located within fill buffers within DCU 128 (FIG. 3) and DCU circuitry is directly employed for inputting and outputting data from the write buffer, even though the data is considered to be "uncacheable." It should be noted, however, that traditional DCU operations are not performed on the uncacheable data within the write buffer. Rather, only cache-line input and output operations are performed. Since the actual hardware for use in loading data into the write buffer lines and evicting data therefrom may be based on entirely conventional DCU circuitry, such will not be described in detail herein.

As noted above, a write buffer line 136 is evicted using eviction unit 139 if the line is full or if new data is received which cannot be placed in any of the four write buffer lines. Additionally, however, the contents of a partially filled buffer line may be evicted under other circumstances as well, including the occurrence of a synchronization fence. Indeed, the periodic use of a synchronization fence ensures that data placed within the write buffer does not remain indefinitely, but is evicted fairly promptly.

A total of four buffer lines are provided within write-combining buffer 132, in part, to allow data to be stored into one line while other data is concurrently evicted from another line and to allow data having differing base addresses to be stored simultaneously in separate lines. However, there is no requirement that four write buffer lines be used. Rather, the write buffer may be implemented using only a single cache-line-sized buffer or using eight, sixteen or more buffer lines. The actual number of buffer lines employed and the size and configuration of each line, may be selected in accordance with particular applications (with each line having the length of a data cache-line within DCU 128).

For an example wherein graphics write operations are performed, with each write operation being defined by an eight-bit pixel, a total of thirty-two pixels are sequentially stored within a single cache-line 136, so long as the pixels share the same base address. For typical graphics operations, such as displaying a line or displaying an entire screen, pixels are typically generated in sequence, with many pixels sharing a common base address. Hence, the write-combining feature illustrated in FIG. 4 is ideally employed. Once thirty-two pixels are stored within a single line, the line is evicted. Simultaneously new data, perhaps corresponding to a new base address is read into another one of the buffer lines 136. This process proceeds until all data pixels are processed.

As noted above, when an entire buffer line is filled, burst mode eviction techniques are employed to transmit all of the data efficiently. Burst mode techniques typically employ five clock cycles to evict an entire cache-line. Hence five clock cycles is all that is required to evict all thirty-two bytes of graphics write data from one of the buffer lines of write-combining buffer 132. This represents a substantial increase in efficiency over systems wherein each individual graphics write operation is stored into a cache-line-sized buffer, then immediately evicted, before a second graphics write is stored. With a single byte eviction requiring three clock cycles, ninety-six clock cycles or more are required to evict thirty-two pixels sequentially in a manner employed by such systems.

If an entire buffer line is not full at the time of eviction, such as when a synchronization fence is detected, then burst mode output techniques may not be usable. Eviction of partially-filled buffer lines may be achieved in a number of ways in accordance with the invention. In the implementation illustrated in FIG. 4, each byte within the partially filled cache-line is separately read out by a single byte eviction unit 150, at, for example, three clock cycles per byte. By individually reading out each byte, part of the advantage of combining separate bytes within a single cache-line-sized buffer may be lost. However, even in such case some benefit is gained by combining separate data write bytes into a single cache-line. From a statistical standpoint, overall processing speed is still enhanced, since at least some of the buffer line evictions typically will be for full cache-lines.

In a preferred implementation illustrated in FIG. 5, several different burst mode eviction components are employed with each burst mode component optimized for a different sized burst. A best fit algorithm selects which burst mode component is optimal given the number of data units in the line to be evicted. In the preferred implementation of a write-combining buffer 232, illustrated in FIG. 5, an output unit 239 includes a thirty-two byte burst mode eviction. 248, an eight byte burst mode eviction unit 254, a sixteen byte burst mode eviction unit 256 and a best fit determination unit 255. Each of these units are provided along with a single byte eviction unit 250.

Single byte eviction unit 250 evicts a single byte from one of the buffer lines using three clock cycles. Thirty-two byte burst mode eviction unit 248 outputs a completely filled cache-line in burst mode in, for example, five clock cycles. Eight byte eviction unit 254 evicts eight bytes of data from one of the buffer lines in an eight byte burst, using, for example, three clock cycles. Sixteen byte eviction unit 256 outputs sixteen bytes using, for example, a four or five clock burst mode eviction. Thus, a set of four different eviction units is provided.

Best fit determination unit 255 determines the number of bytes contained within a buffer line set for eviction, then controls the operation of the various eviction units 248, 250, 254 and 256 to provide for efficient eviction of the data contained within the cache-line. Thus, for example, if a total of eight bytes are contained within the line to be evicted, eight byte burst mode output 254 is controlled to perform the entire eviction. If ten bytes are required for eviction, eight byte unit 254 is controlled to evict eight of the ten bytes and single byte unit 250 is controlled to sequentially output the remaining two bytes. With an eight byte eviction occurring within three clock cycles and an individual byte eviction occurring within three clock cycles, the ten bytes are fully output in a total of nine clock cycles, still a substantial improvement over the thirty clock cycles that would be required to output the ten bytes without the write-combining capability of the invention. As another example, if a total of twenty-four bytes are contained within the buffer line to be evicted, then eight byte and sixteen byte eviction units 250 and 256 are each controlled to operate once, thus achieving output of the entire twenty-four bytes within, perhaps, only seven to ten clock cycles.

As can be appreciated, any number of different burst mode eviction units may be provided to achieve any desired granularity in the eviction process. Of course, with an increase in the number of separate eviction units, a corresponding increase in the complexity of the overall silicon circuitry is required to implement the write-combining buffer. For practical applications, tradeoffs are made in output efficiency versus implementation complexity. For may applications, it is sufficient to supply a single byte output unit in combination with a cache-line burst mode output unit as set forth in FIG. 4. The design, implementation and operation of the eight byte and sixteen byte burst eviction units, may be entirely in accordance with conventional burst processing techniques, which will not be described in detail herein.

Thus, a sequence of partial write operations are performed to evict a partially filled write-combining buffer line. Although partial write operations may be performed in conventional systems for outputting portions of cacheable data from a cache line, certain significant differences are worth noting between conventional systems and the embodiments of the invention described herein. For example, when partial writes are performed for cacheable data within a DCU line, a certain amount of delay is provided between consecutive partial write operations to allow other processes or processors to observe the write operation, to allow processor ordering to be maintained. With the present invention, processor ordering is ignored for writes from the write-combining buffer. No delay between consecutive partial write operations is required since global observability is no longer necessary. Furthermore, in most conventional systems where partial writes are allowed for data within DCU cache lines, partial writes are performed only after an entire cache line is read into the DCU, via a read-for-ownership or similar operation. With the write-combining buffer of the present invention, no read-for-ownership or similar operation need be performed to read an entire line of uncacheable data into the write combining buffer. Rather, only data units actually subject to write operations need be placed within the write-combining buffer lines. Hence, potentially time consuming system bus transactions normally associated with the processing of DCU cache lines are avoided.

Although described primarily with reference to graphics write operations, the write-combining capability of the invention may also be advantageously exploited for use with other data write operations including, for example, string move operations and string copy operations.

To facilitate a determination of which data writes are to be processed by the write buffer and which are to be processed by other circuitry, a value may be stored in connection with each unit of data indicating the disposition of the data. The value may indicate whether data is cacheable or uncacheable, with only uncacheable data write operations being processed using the write-combining buffer of the invention. Also, the invention is advantageously exploited within microprocessors employing out-of-order or speculative processing operations. In such an implementation, the value also indicates whether the data to be processed is speculatable or non-speculatable. Only unspeculative but speculatable data units are subject to write-combining within the write-combining buffers.

In a preferred embodiment, the value indicating whether a data write can be processed within the write-combining buffer is a "memory type" value, referred to as an un-cached speculative write-combining (USWC) memory type. The USWC memory type value is associated with certain ranges of physical addresses. A mapping relating physical addresses to the USWC memory type is provided explicitly within the microprocessor of the invention, preferably within a memory-type range register (MTRR) unit within a page miss handler (PMH) connected to the DCU bus.

Prior to processing write data, the memory type value is determined from the MTRR's of the PMH. If the memory type value is found to be of the USWC memory type, then the data write is combinable with other data writes within the write-combining buffer. If the memory type of the data write is of the data type other than USWC, then the data write is not combined with other USWC data writes within the write-combining buffer. To expedite a determination of the memory type associated with each data write, memory type values are preferably cached within a translation lookaside buffer (TLB) within the microprocessor such that a TLB lookup determines the memory type, if the physical address of the data write is cached within the TLB. It should be noted that significant performance loss may be incurred if the memory type values are not explicitly stored within the microprocessor itself, since any necessary bus transaction to determine the memory type could degrade performance, perhaps to the extent that the efficiency gained by providing write-combining could be lost.

A description of the MTRR's is provided within the U.S. Patent Application entitled "Methods and Apparatus for Determining Memory Type by a Processor", cross-referenced above. A description of the manner by which memory type values are cached within a TLB is set forth within the U.S. Application entitled "Method and Apparatus for using a Translation Lakaside Buffer in Real Mode", cross-referenced above. A description of memory type values, in general, is provided within the U.S. Patent Application entitled "Methods and Apparatus for Processing Memory Type Information Within an Out-of-order Microprocessor", cross-referenced above.

In a multiprocessor implementation of the invention such as illustrated in FIG. 3, care should be taken to ensure that processor ordering is not violated in a manner that would allow for possible software execution problems. As described above, processor ordering implies that write operations generated by one processor will be observed in the same order by all other processors. Hence, if a first processor performs two write operations W1 and W2 to two locations L1 and L2, in that order, all other processors in the system, reading either locations L1 and L2, must read the value in L1 before reading the value in L2. As can be appreciated, by combining write operations into a single cache-line-sized buffer, then simultaneously evicting all of the writes, the original order by which the writes were generated is not necessarily preserved.

One possible solution is to allow each microprocessor in the computer system to snoop the write-combining buffers of every other microprocessor. Another possible solution is to maintain ordering information within each write-combining buffer such that, upon eviction, the oldest data writes are output first. Neither of the aforementioned solutions is ideal.

The solution implemented by the write-combining buffer system of the invention is to relax the requirement for processor ordering for all data stored within the write-combining buffers. An important aspect of the invention is the recognition that, for typical types of uncacheable data, such as data associated with graphics write operations, processor ordering is not necessary. In other words, the particular order by which pixels are displayed on a screen is not crucial. Indeed, for the implementation of FIG. 3 wherein a frame buffer is employed, pixels within the frame buffer are transmitted in a predetermined sequence to the CRT screen after the pixels are written into the frame buffer. Hence, the actual order by which the data is written into the frame buffer may not be relevant.

To help ensure that no data is stored within the write-combining buffer for data write operations in which processor ordering must be preserved, a value is preferably stored with each data write identifying whether processor ordering needs to be preserved. This value may be the same USWC memory-type value as described above. Such value is set and controlled by software in accordance with a programmers desires. Hence, for data wherein the programmer wishes processor ordering to be preserved, the associated value is set to ensure that the data is not stored within the write-combining buffer and hence is not subject to a possible violation of processor ordering. The ability to control whether processor ordering is preserved is particularly desirable for use with microprocessors having speculative or out-of-order capability. It is also worth noting that, for microprocessors generating periodic synchronization fences, the possibility of an actual processor ordering violation is fairly minimal since the periodic synchronization fence ensures that data is periodically evicted from the write-combining buffer. Hence, data does not typically remain in the write-combining buffer long enough to result in a processor ordering problem. Further, using software, one can ensure that synchronization fence occurs prior to any data write that could yield an ordering problem.

What has been described is an improved method and apparatus for performing certain data write operations within a microprocessor adapted manipulate data within cache-line-sized units. Among other things, a substantial increase in data write efficiency is achieved by exploiting burst-mode eviction techniques. Furthermore, DCU circuitry, provided for primarily inputting and outputting data from cache-lines, may be utilized to also control the input and output of data to and from write buffers containing uncacheable data. With this improvement, the ability to transmit full motion video from a microprocessor to a frame buffer is facilitated while still maintaining the advantages of buffering the graphics pixels within cache-line-sized units.

The microprocessor described herein can be configured using a wide variety of fabrication techniques, including, for example, silicon or gallium arsenide techniques. Each component described above may be configured within a single integrated chip or on several chips. The microprocessor is preferable configured in accordance with Intel Processor Architecture. However, principles of the invention may be applied to other microprocessor architectures as well as are not limited to an Intel architecture.

Although preferred and exemplary implementations of the invention have been described herein, such are merely illustrative of the invention and should not be construed as limiting the scope of the invention. Rather, principles of the invention may be exploited within a wide variety of implementations and for a wide range of applications.

What is claimed is:

1. An apparatus for processing uncacheable data units, said apparatus comprising:

a line buffer means for storing data units in cache-line sized buffer lines;

combining means for combining a plurality of uncacheable data units having a common base address into a selected line of said line buffer means; and means for evicting said selected line of said line buffer means.

2. The apparatus of claim 1, wherein said data units correspond to separate graphics write operations.

3. The apparatus of claim 1, wherein said means for evicting operates to evict said selected line in burst mode, if said selected line is full.

4. The apparatus of claim 1, wherein said means for evicting operates to evict said selected line one data unit at a time, if said selected line is partially full.

5. The apparatus of claim 1, wherein said means for evicting operates to evict said selected line a plurality of data units at a time, if said selected line is partially full.

6. The apparatus of claim 1, wherein said means for evicting includes first burst means for outputting a first plurality of data units in a single burst;

second burst means for outputting a second plurality of data units in a single burst; and means for controlling said first and second burst means to evict all of said data units within said selected line.

7. The apparatus of claim 6, wherein said means for controlling includes a best fit determination means for determining a best sequence for controlling said first and second burst means to evict all of said data units within said selected line.

8. The apparatus of claim 1, wherein said means for evicting includes a plurality of burst means for outputting a plurality of data units in a single burst, with each burst means outputting a partial write-containing different number of data units in a single burst; and means for controlling said plurality of burst means to evict all of said data units within said selected line using partial writes.

9. The apparatus of claim 8, wherein said means for controlling generates partial writes without any substantial delay between consecutive partial writes.

10. The apparatus of claim 8, wherein said means for controlling includes a best fit determination means for determining a best sequence for controlling said plurality of burst means to evict all of said data units within said selected line.

11. The apparatus of claim 8, wherein a first of said plurality of burst eviction means outputs eight of said data units in burst mode, a second of said burst eviction means outputs sixteen of said data units in burst mode, and a third of said burst mode eviction units outputs all of said data units within a filled buffer line in burst mode.

12. The apparatus of claim 10, further including means for outputting a single data unit from said buffer line.

13. The apparatus of claim 1, wherein each of said data units includes a value identifying whether said data unit is combinable with other data units and wherein said combining means reads said value from said data unit and combines said data unit with other data units, only if said value indicates that said data unit is combinable.

14. The apparatus of claim 1, wherein said means for evicting operates to evict all data with said combining means upon the detection of a synchronization fence within a microprocessor.

15. An apparatus for processing uncacheable data units, said apparatus comprising:

line buffer that stores data units in cache-line sized buffer lines;

a write-combining unit that combines a plurality of uncacheable data units having a common base address into a selected buffer line; and an eviction unit that evicts said selected line.

16. The apparatus of claim 15, wherein said data units correspond to separate graphics write operations.

17. The apparatus of claim 15, wherein said eviction unit evicts said selected line in burst mode, if said selected line is full.

18. The apparatus of claim 15, wherein said eviction unit evicts said selected line one data unit at a time, if said selected line is partially full.

19. The apparatus of claim 15, wherein said eviction unit evicts said selected line a plurality of data units at a time, if said selected line is partially full.

20. The apparatus of claim 15, wherein said eviction unit includes first burst eviction unit capable of outputting a first plurality of data units in a single burst;

second burst eviction unit capable of outputting a second plurality of data units in a single burst; and a control unit that controls said first and second burst output units to evict all of said data units within said selected line.

21. The apparatus of claim 20, wherein said control unit includes a best fit determination unit that determines a best sequence for controlling said first and second burst units to evict all of said data units within said selected line.

22. The apparatus of claim 15, wherein said eviction unit includes a plurality of burst eviction units capable of outputting a plurality of data units in a single burst, with each burst eviction unit outputting a different number of data units in a single burst; and a control unit that controls said plurality of burst eviction units to evict all of said data units within said selected line using partial writes.

23. The apparatus of claim 22, wherein said control unit generates partial writes without any substantial delay between consecutive partial writes.

24. The apparatus of claim 22, wherein said control unit includes a best fit determination unit that determines a best sequence for controlling said plurality of burst eviction units to evict all of said data units within said selected line.

25. The apparatus of claim 22, wherein a first of said plurality of burst eviction units outputs eight of said data units in burst mode, a second of said burst eviction units outputs sixteen of said data units in burst mode, and a third of said burst mode eviction units outputs all of said data units within a filled buffer line in burst mode.

26. The apparatus of claim 22, further including a single data unit eviction unit.

27. The apparatus of claim 15, wherein each of said data units includes a value identifying whether said data unit is combinable with other data units and wherein said combining unit reads said value from a said data unit and combines said data unit with other data units, only if said value indicates that said data unit is combinable.

28. In a microprocessor having a line buffer means for storing data units in cache-line sized buffer lines, a method for processing uncacheable data units, said method comprising the steps of:

receiving a plurality of uncacheable data units having a common base address;

combining said plurality of uncacheable data units having a common base address into a selected line of said line buffer means; and evicting said selected line of said line buffer means.

29. The method of claim 28, wherein said data units correspond to separate graphics write operations.

30. The apparatus of claim 28, wherein said step of evicting is performed to evict said selected line in burst mode, if said selected line is full.

31. The method of claim 28, wherein said step of evicting is performed to evict said selected line one data unit at a time, if said selected line is partially full.

32. The method of claim 28, wherein said step of evicting is performed to evict said selected line a plurality of data units at a time, if said selected line is partially full.

33. The method of claim 28, wherein said step of evicting includes the steps of:

determining the number of data units within said buffer line; and selectively repeatedly outputting either a first plurality of data units or a second plurality of data units to evict all data units within said selected line.

34. The method of claim 33, wherein said step of selectively repeating outputting data units includes the step of performing a best fit determination to determine a best sequence for selectively repeatedly said first and second plurality of data units to evict all of said data units within said selected line.

35. The method of claim 28, wherein said microprocessor includes a plurality of burst means for outputting a plurality of data units from said buffer line in a single burst, with each burst means outputting a different number of data units in a single burst, and wherein said step of evicting includes the step of:

controlling said plurality of burst means to evict all of said data units within said selected line using partial writes.

36. The method of claim 35, wherein said step of controlling is performed to generate partial writes without any substantial delay between consecutive partial writes.

37. The method of claim 35, wherein said step of controlling includes the step of performing a best fit determination to determine a best sequence for controlling said plurality of burst means to evict all of said data units within said selected line.

38. The method of claim 35, wherein a first of said plurality of burst eviction means outputs eight of said data units in burst mode, a second of said burst eviction means outputs sixteen of said data units in burst mode, and a third of said burst mode eviction units outputs all of said data units within a filled buffer line in burst mode.

39. The method of claim 38, further including the step of outputting selected units of data within said line one data unit at a time.

40. The method of claim 28, wherein each of said data units includes a value identifying whether a said data unit is combinable with other data units and wherein said step of combining includes the steps of reading said value from said data unit and combing said data unit with other data units, only if said value indicates that said data unit is combinable.

* * * * *

UNITED STATES PATENT AND TRADEMARK OFFICE
CERTIFICATE OF CORRECTION

PATENT NO.    : 5,561,780
DATED         : October 1, 1996
INVENTOR(S)   : Glew et al.

It is certified that error appears in the above-identified patent and that said Letters Patent is hereby corrected as shown below:

In column 2 at line 20 delete "traits" and insert --units--

In column 1 at line 15 insert --12/22/93-- prior to "entitled"

In column 4 at line 34 delete "so:me" and insert --some--

Signed and Sealed this

Eighteenth Day of February, 1997

Attest:

BRUCE LEHMAN

*Attesting Officer*                *Commissioner of Patents and Trademarks*